United States Patent Office 3,131,072
Patented Apr. 28, 1964

3,131,072
NOVEL SILICA AEROGELS AND PROCESSES
FOR PREPARING SAME
Thomas A. Taulli, Florissant, Mo., assignor to Monsanto Chemical Company, St. Louis, Mo., a corporation of Delaware
No Drawing. Filed Nov. 10, 1960, Ser. No. 68,354
19 Claims. (Cl. 106—306)

The present invention relates to novel silica aerogels, and to novel silica sols from which such aerogels may be produced. The present invention also relates to processes for preparing such aerogels and sols. The present invention further relates to silica aerogels containing certain alkaline-earth metals which are chemically bound in such aerogels. The present invention more particularly relates to amorphous, pulverulent, metal-containing, silica aerogels characterized in having novel properties, particularly unique particle size distribution and external surface areas, and which are useful as thickening agents.

It has been proposed heretofore, in U.S. Patent No. 2,093,454, dated September 21, 1937, to Samuel S. Kistler, to produce silica aerogels by precipitating colloidal silica in a liquid as a gel, washing the gel with water to remove an appreciable amount of inorganic metal salts present therein, replacing the water in the gel with a lower boiling water-miscible liquid such as ethanol, confining the resultant gel in an autoclave and heating the gel until the liquid in the gel has reached a temperature at which the surface tension of the liquid is so small as to produce no substantial shrinkage of the gel when the vapor is allowed to escape. The vapor is then slowly released from the autoclave so as not to impair the internal structure of the gel. In this way the skeleton structure of the gel is preserved approximately in its original porous state and the produce is a light fluffy powder having void spaces up to ninety-nine percent and higher.

It has also been proposed heretofore in U.S. Patent No. 2,285,449 to Morris D. Marshall, issued June 9, 1942, to prepare inorganic aerogels such as silica aerogels by first forming an aquasol containing a dissolved inorganic alkali metal salt and a colloidal inorganic oxide such as colloidal silica, adding to the aquasol a quantity of a water-miscible organic solvent such as ethanol to precipitate such salt, removing a substantial portion of the precipitated inorganic alkali metal salt from the resulting hydro-organosol and removing the liquid phase, which consists of water and an organic solvent (e.g., ethanol), from the sol without substantially subjecting the sol to a compressive liquid-solid interface. The silica aerogels, prepared as afore-described, contain some alkali metal cations and are characterized in having a highly porous structure, a specific surface area of between 100 and 250 square meters per gram, and are readily ground or comminuted to particles or aggregates having an average particle size of from 5 to 9 microns which particles have an external surface area of generally less than 0.5 square meter per gram. Although it is possible to further reduce the particle size of such aerogels, such reduction can only be accomplished by extensive grinding or comminuting (which is expensive) and results in a relatively small decrease in particle size and a concomitant small increase in external surface area, such external surface area being below 0.7 square meter per gram.

Silica aerogels, prepared as above described generally have an acid number of above 0.1 but below 5. The term "acid number" as used herein in connection with the aforementioned silica aerogels of Marshall and Kistler is intended to mean the number of milligrams of KOH required to neutralize one gram of silica material to a pH of 5.2. This acid number is suitably determined by thoroughly mixing 4 grams of dry silica material with 100 milliliters of distilled water and then titrating the resultant suspension with 0.01 N potassium hydroxide to a pH of 5.2 as measured by glass electrodes which have been standardized against an aqueous buffer solution at a pH of 4.0. The acid number is calculated by the following equation $$\frac{\text{Milliliters of KOH solution} \times N \times 0.0561 \times 1000}{4} = \text{acid number}$$

In the above equation N represents the normality of the KOH solution.

Silica gels, in general, are almost always composed of polymeric molecules of polysilicic acid or siloxane polymers having a number of siloxy groups and are usually characterized by the structural formula.

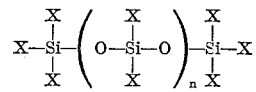

wherein X may be an OH group, a siloxy

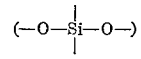

or a polysiloxy

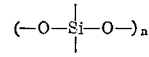

group and $n$ may be a number up to or in excess of one thousand. Where the silica gel is a hydrogel or a hydroorgano gel, X represents a relatively large number of OH groups. On the other hand, where the silica gel is an aerogel X preponderantly represents siloxy or polysiloxy groups.

Such silica aerogels have been widely used as insulating materials, as reinforcing agents or fillers in silicone rubber formulations and as flatting agents in paint and varnish formulations. However, the utility of the afore-described silica aerogels as reinforcing agents in liquid polymerizable materials or liquid thermosetting polymers such as, for example, polyester and epoxide polymers is severely limited due to the inability of these aerogels to efficiently thicken such polymers prior to curing. Thus, in order to secure a desirable thickening of uncured polymers, a relatively large amount, e.g., up to 12% by weight of such aerogels, is required to obtain adequate thickening whereas amounts of thickening agents employed in excess of 4% by weight of the polymers usually adversely affect the properties of such polymers when cured. Also, the relative inefficiency of these aerogels as thickening agents limit their use in polymerizable surface coating materials, such as paints and varnish, where a thixotropic state is desired to prevent the flow and run-off of the coating materials after their application to a particular surface.

In accordance with the present invention it is possible to provide novel silica aerogels which have many of the advantages of the silica aerogels described in the prior literature and which, in addition, have excellent thickening properties when incorporated in organic liquids and thus do not have the aforementioned disadvantages inherent in previously known silica aerogels.

It is one object of this invention to provide novel silica aerogels containing alkaline earth metals chemically combined therein.

It is another object of this invention to provide novel silica sols from which such novel silica aerogels may be prepared.

It is another object of the present invention to provide a process of preparing a silica aerogel containing alkaline earth-metal atoms chemically combined in such aerogel.

It is a further object of the present invention to provide novel, amorphous, pulverulent, alkaline earth-metal-containing silica aerogels having a unique particle size distribution and external surface area.

It is still further object of the present invention to provide novel, amorphous, pulverulent, alkaline earth metal-containing silica aerogels having unique physical properties and which are especially useful as thickening agents.

Still further objects and advantages of the present invention will become apparent from the following description and the appended claims.

The present invention provides novel, pulverulent, amorphous, metal-containing silica aerogels comprising a silica polymer having siloxy groups and containing an alkaline earth metal chemically bound to a portion of the siloxy groups and having an acid number of 0 or less. The present invention also provides aerogels of this type which are further characterized in having a specific surface area of from 10 to 200 square meters per gram, an $SiO_2:M$ ratio of from about 5:1 to about 66:1, wherein M is the afore-mentioned alkaline-earth metal and is chemically bound to a portion, e.g., from about 3% to about 40%, of the siloxy groups of the silica in the aerogel. These novel silica aerogels may be used as such, for example, as insulating materials, or may be ground to provide finely divided aerogels having a specific surface area of from 10 to 200 square meters per gram, an external surface area of from 0.9 to 1.6 square meters per gram, and an average particle size below 4 microns, preferably in the range of from 2 to 4 microns. Such ground aerogels are then very useful as thickening agents as described herein.

The present invention is in part, based on the discovery that when certain water soluble alkaline earth metal salts are contacted with, or incorporated in, colloidal acidic silica hydro-organosols such as, for example, the sols described in U.S. Patent No. 2,285,477 to John F. White, issued June 9, 1942, or the hydro-organosols described in the afore-mentioned Marshall patent, a novel, metal-containing silica hydro-organosol is formed having alkaline earth metal ions of the afore-mentioned metal salts contained therein. When such sols are allowed to stand or are heated they gel relatively rapidly, and when the resultant gel is heated in a pressure resistant vessel to convert the liquid phase to a vapor phase, and the vapor is then separated from the solids, without appreciable shrinkage in volume of the gel, it is possible to form the novel silica aerogels of this invention having the afore-described characteristics. In converting the liquid phase of the sols to the vapor phase, it is essential that the sols are not subjected to a substantial compressive liquid-solid interface until all of the liquid phase has been converted to a vapor phase.

The starting acidic silica hydro-organosols in which the water soluble alkaline-earth metal salts may be incorporated in accordance with this invention may be prepared for example according to the processes described in the afore-mentioned U.S. Patent No. 2,285,477, issued to John F. White. The process of this patent comprises first forming an acidic silica aquasol, having a pH between 1.8 and 4.5, by acidifying a water soluble alkali silicate such as sodium silicate with a mineral acid such as sulfuric acid, in the proper proportions. This sol, which is an aquasol, is cooled to cause precipitation of the salt formed by the reaction of the silicate and the mineral acid, and the precipitated salt is then removed from the sol. The process of the White patent also provides for the addition of about 0.5% to 25% by weight of the sol of a water-miscible organic liquid, such as ethanol, prior to cooling to facilitate the precipitation of further quantities of the salt. These acidic silica hydro-organosols have a relatively low salt content of about 0.1 to 2% by weight, depending upon the amount of organic liquid used prior to cooling. Such silica hydro-organosols may be used in the preparation of the metal-containing aerogels of this invention by dissolving the above referred to water soluble alkaline earth metal salts therein. The silica hydro-organosols produced in accordance with the processes of the Marshall patent hereinbefore referred to, may be used in a similar manner as starting sols in which the water soluble alkaline earth metal salts may be incorporated.

The acidic silica hydro-organosols of the process of the afore-said White and Marshall patents usually contain small amounts of the alkali-metal salt formed by the reaction of the silicate and acid, but in some instances may contain more than 2% by weight of such salt. This alkali-metal salt content may be undesirable since a reaction between such salt and the water soluble alkaline-earth metal salts may take place, thus preventing the formation of the metal-containing aerogels, and accordingly it is desirable to reduce this alkali metal salt content to the point where the sol contains less than 2%, preferably less than 1%, by weight of the alkali metal salt. This is suitably accomplished for example, by adding additional quantities, e.g., up to 75% by weight of the water miscible organic liquid to the sol and/or by passing the hydro-organosol through a bed of a water insoluble cat-ion-exchange material operating on the hydrogen cycle to remove the alkali metal cations and thereafter passing the sol through a bed of suitable anion-exchange material to remove the anions. Low temperatures of the sol, of the order of —5° C. to 10° C., also aids in precipitation and subsequent removal of the alkali metal salt.

The acidic silica hydro-organosols employed in producing the metal-containing silica sols of this invention may contain varying amounts of silica and electrolyte, or a salt of an alkali metal silicate and an acid, and the pH may be varied considerably. However, when such sols are used as starting materials in the processes for preparing the metal-containing aerogels of this invention, it is preferred to employ acidic sols which have a pH between about 1.8 and 4.5 and contain between 4% and 15% by weight of silica as $SiO_2$, about 0.001% to 2% by weight of such salt or electrolyte and the balance consisting essentially of water and a water-miscible organic liquid having a boiling point below that of water.

In a preferred embodiment of this invention the starting acidic silica sols are acidic silica hydro-organosols which are prepared from acidic silica aquasols which are in turn prepared by first reacting an aqueous solution of sodium silicate and aqueous sulfuric acid at a temperature of between about 0° C. and 15° C. in such proportions and concentrations as to provide an acidic silica aquasol having a pH of about 2 to 4 and containing sodium sulfate and from about 5% up to 20% by weight of $SiO_2$ as silicic acid. The silica aquasols having more than 17% by weight of $SiO_2$ generally must be kept at about 0°C. to prevent rapid gelation.

The silica aquasol thus formed is maintained at a temperature in the range of about 0° C. to 15 C. and a substantially neutral water-miscible organic liquid such as ethanol is mixed therewith to form a silica hydro-organosol containing from about 25 to 66% by weight of the organic liquid and from about 4% to 11% by weight of $SiO_2$ as silicic acid. The sodium sulfate is substantially insoluble in the above sol and thus precipitates from the sol to a substantial extent. On removal of this $Na_2SO_4$ by centrifugation, filtration, or the like, a sol is obtained which contains about 0.1% to 0.6% by weight of $Na_2SO_4$. The amount of $Na_2SO_4$ in the sol depends primarily on the concentration of the organic liquid in the sol and the temperature of the sol.

The neutral or substantially neutral water-miscible organic liquids employed may have a boiling point below or above that of water. However, in the present invention, it is desirable to employ neutral or substantially neutral, water-miscible organic liquids, preferably those consisting of carbon, hydrogen, and oxygen atoms, which have a boiling point below that of water at atmospheric pressure. As examples of the last-mentioned liquids may per gram, an average particle size of from 2.5 to 3.5 microns and an acid number of 0 or less.

The particle size and external surface area measurements of the novel metal-containing silica aerogels of this invention have been determined by using the method described by J. H. L. Watson in volume 20, page 576, of "Analytical Chemistry," published in June 1948.

By proper selection of the various variables such as the properties of the acidic silica hydro-organosols and the amount of calcium salt employed, it is possible in accordance with the processes of this invention to prepare or provide finely divided, amorphous, silica aerogels comprising a silica polymer and siloxy groups and containing calcium atoms chemically bound to from 9% to 28% of such siloxy groups. These aerogels are generally characterized in having a specific surface area of from 50 to 175 square meters per gram, an external surface area of from 0.9 to 1.6 square meters per gram, an average particle size of from 2 to 4 microns and are further characterized in having an $SiO_2$ to Ca ratio of about 7 to about 22 molecules of $SiO_2$ for each atom of calcium in the aerogel.

By proper selection of the various variables such as the properties of the acidic silica hydro-organosols and the amount of calcium salt employed it is possible, in accordance with the processes of this invention to prepare or provide finely divided amorphous magnesium-containing silica aerogels comprising a silica polymer having siloxy groups and containing magnesium atoms chemically bound to from 12% to 26% of the siloxy groups in the aerogel. Such aerogels are generally characterized in having a specific surface area of from 10 to 200 square meters per gram, an external surface area of from 0.9 to 1.1 square meters per gram, an average particle size in the range of from about 3 to 4 microns and are further characterized in having an $SiO_2$:Mg ratio of from about 6 to about 13 molecules of $SiO_2$ per atom of magnesium in the aerogel.

It has also been found possible to prepare a magnesium-containing silica aerogel by incorporating from about 3% to about 9% by weight of magnesium, in the form of a water soluble magnesium salt such as magnesium acetate, in an acidic silica hydro-organosol having a pH of from about 1.5 to 4.5, a silica content of from about 5% to 11% by weight and a liquid phase composed of water and from about 25% to about 66% by weight, based on the weight of the sol, of a boiling point below that of water at atmospheric pressure and containing from 0.01% to 0.2% by weight of an alkali metal salt or an alkali metal silicate and an acid. The magnesium containing sols thus formed can be readily converted to magnesium-containing aerogels as hereinbefore described. Such aerogels can then be ground to produce finely divided powdered magnesium-containing aerogels having a particle size of between 2 and 4 microns which are useful as thickening agents. The properties of such aerogels as thickening agents are enhanced by heating the aerogels at a temperature of from 500° C. to 650° C.

A further understanding of the aerogels, sols and processes of the present invention will be obtained from the following examples which are intended to illustrate the invention but not to limit the scope thereof, parts and percentages being by weight unless otherwise specified.

*Example I*

Twenty-one hundred parts of an acidic, silica ethanol-aquasol containing 11% $SiO_2$, 50% ethanol, 0.3% $Na_2SO_4$ the remainder consisting of water, and having a pH of 3.1 was diluted with 980 parts absolute ethanol. To this mixture was added 238.4 parts of a 26.6% solution of calcium acetate monohydrate to provide a homogeneous sol having a pH of 6.3 and containing 7.0% of $SiO_2$ and 0.66% of calcium as $Ca^{++}$, 60% of ethanol and the balance consisting of water and ethyl acetate, the latter being formed by reaction of the ethanol and acetate anions of calcium acetate.

The bulk of the ethanol-aquasol containing the calcium ions was charged to an autoclave until 75% of the volume of the autoclave was occupied by the sol. The autoclave was then closed and heated until a pressure of 1900 pounds per square inch gauge (which was slightly above the critical pressure) was attained during which time the sol was converted to an ethanol-aquagel in situ. Heating was continued and the ethanol-water vapor (which also contained ethyl acetate vapor as the result of the reaction between the acetic acid anion of the calcium acetate and a portion of the ethanol) was released intermittently from the autoclave to maintain the pressure at 1900 pounds per square inch gauge until a temperature of 300° C. was obtained. This temperature was above the critical temperature of the liquid phase of the organo-aquagel. The vapor in the autoclave was released slowly until substantially all of the vapor was removed and the autoclave was then cooled. A calcium-containing silica aerogel of excellent quality was obtained.

This silica aerogel was then ground in an air attrition mill at an air pressure of 58 pounds per square inch gauge to provide a pulverulent, amorphous material, having an average particle size of 2.9 microns, a specific surface area of 58 square meters per gram and an external surface area of 1.22 meters per gram. The particles had a particle size distribution wherein 4% of the particles were less than 1 micron, 16% were between 1 and 2 microns, 40% were between 2 and 3 microns and 40% were between 3 and 4 microns. An X-ray diffraction analysis demonstrated that the material was entirely amorphous and the patterns showed that no crystalline materials were present. The ground aerogel was chemically analyzed and found to contain 5.9% calcium and 94% $SiO_2$ wherein the calcium atoms were chemically bound to about 18% of the siloxy groups of the silica. A 2.0% slurry of the ground aerogel had an initial pH of 8.5 and when the slurry was titrated with 0.1 normal acetic acid solution, titration curves were obtained which were distinctly different from a titration curve obtained from titrating an equivalent concentration of calcium in the form of an aqueous dispersion of calcium silicate with 0.1 normal acetic acid and such curves were also distinctly different from a titration curve obtained by titrating with a 0.1 normal acetic acid solution, an equivalent concentration of calcium as an aqueous dispersion or solution of calcium hydroxide. The chemical analysis and titration curves clearly demonstrated that the calcium was chemically bound in the polymeric structure of the silica aerogel.

An aerogel produced in the same manner from the original alcosol (without the addition of the absolute ethanol or the calcium acetate solution) had, after grinding, an average particle size of 6.9 microns, a specific surface area of 124 square meters per gram and an external surface area of 0.42 square meter per gram.

When 2% of weight of the calcium-containing silica aerogel was dispersed in a liquid, uncured, commercial polyester resin "Marco 28C," produced by the Celanese Corporation, the viscosity (Brookfield) was increased from 850 centipoises to 3250 centipoises at 25° C. On the other hand a 2% dispersion of the non-metal-containing silica aerogel, in the same polyester resin resulted in a viscosity (Brookfield) of only 1580 centipoises. The viscosity measurements were made with a standard Brookfield Model RVT Synchro-electric Viscosimeter, at 20 revolutions per minute viscosimeter speed.

*Example II*

To 2100 parts of the silica ethanol-aquasol, referred to in the first sentence of Example I was added 980 parts of absolute ethanol. To this mixture was added 332 parts of a 41.5% aqueous solution of magnesium acetate to provide a homogeneous sol having a pH of 6.8 and containing 5.1% $SiO_2$ and 1.2% of magnesium as $Mg^{++}$, 66% of ethanol and the balance consisting of water and ethyl acetate. The resultant sol was processed in the same way as the calcium containing sols as in Example I to produce an amorphous pulverulent magnesium-containing silica aerogel having an average particle size of 3.9 microns, a specific surface area of 51 square meters per gram and an external surface area of 0.99 square meter per gram. The ground aerogel was chemically analyzed and found to contain 9.05% magnesium and 90.05% $SiO_2$ wherein the magnesium atoms were chemically bound to about 26% of the siloxy groups of the aerogel. A 2% slurry of this aerogel had a pH of 7.6. Titration and conductance determinations demonstrated that the aerogel did not contain magnesium silicate or magnesium oxide and that the magnesium was chemically bound in the polymeric structure of the silica aerogel. When 2% by weight of this magnesium containing aerogel was dispersed in the commercial polyester resin referred to in Example I the viscosity (Brookfield) of the polyester increased from 850 centipoises to 2290 centipoises at 20 revolutions per minute viscosimeter speed.

*Example III*

The process of Example I was repeated except that the starting sol contained acetone instead of ethanol and was also further diluted with acetone in place of ethanol. A pulverulent silica aerogel containing 6.0% by weight of calcium and having substantially the same physical and chemical properties, e.g., particle size, specific surface area, external surface area and thickening properties as the calcium containing aerogel of Example I, was obtained.

*Example IV*

The process of Example II was repeated except that the starting sol contained acetone instead of ethanol and was also further diluted with acetone in place of ethanol. A pulverulent silica aerogel containing 8.9% by weight of magnesium and having substantially the same physical and chemical properties, e.g., particle size, specific surface area, external surface area and thickening and thixotropic properties as the magnesium-containing aerogel of Example II was produced.

The metal-containing silica aerogels of the present invention are generally suitable for all the applications and uses of previously described silica aerogels per se and additionally can be used as thickening agents for materials in which the previously described silica aerogels per se cannot ordinarily be used in a satisfactory manner.

What is claimed is:

1. An amorphous metal-containing silica aerogel consisting essentially of a silica polymer having siloxy groups and containing an alkaline earth metal selected from the group consisting of calcium and magnesium chemically bound to a portion of said siloxy groups in said aerogel, said aerogel being further characterized in having an $SiO_2$ to M ratio from about 5:1 to about 66:1 wherein M is said alkaline earth metal.

2. An amorphous metal-containing silica aerogel consisting essentially of a silica polymer having siloxy groups, said aerogel being characterized in having a specific surface area of from about 10 to about 200 square meters per gram and containing an alkaline earth metal selected from the group consisting of calcium and magnesium chemically bound to from about 3% to about 40% of the said siloxy groups in said aerogel, said aerogel being further characterized in having an $SiO_2$ to M ratio of from about 5:1 to 66:1, wherein M is said alkaline earth metal.

3. A finely-divided, amorphous silica aerogel consisting essentially of a silica polymer having siloxy groups and containing calcium atoms chemically bound to from 9% to 28% of said siloxy groups in said aerogel, said aerogel being characterized in having a specific surface area of from 50 to 175 square meters per gram, and external surface area of from 0.9 to 1.6 square meters per gram, an average particle size of from 2 to 4 microns, said aerogel being further characterized in having an $SiO_2$ to Ca ratio of about 7 to about 22 molecules of $SiO_2$ for each atom of calcium in said aerogel.

4. A finely divided amorphous calcium-containing silica aerogel consisting essentially of a silica polymer having siloxy groups and containing calcium atoms chemically bound to from about 16% to 20% of the siloxy groups in said aerogel; said aerogel being characterized in having a specific surface area of from 50 to 175 square meters per gram, an external surface area of from 1.1 to 1.3 square meters per gram, an average particle size of from 2.5 to 3.5 microns; said aerogel being further characterized in having an $SiO_2$ to Ca ratio of about 10 to about 12 molecules of $SiO_2$ for each atom of calcium in said aerogel.

5. A finely-divided amorphous magnesium-containing silica aerogel consisting essentially of a silica polymer having siloxy groups and containing magnesium atoms chemically bound to from 12% to 26% of the siloxy groups in said aerogel, said aerogel being characterized in having a specific surface area of from 10 to 200 square meters per gram, an external surface area of from 0.9 to 1.1 square meters per gram and an average particle size in the range of from about 3 to 4 microns; said silica aerogel being further characterized in having an $SiO_2$:Mg ratio of about 6 to about 13 molecules of $SiO_2$ per atom of magnesium in said aerogel.

6. The process of preparing a silica aerogel which comprises incorporating a water soluble, alkaline-earth metal salt selected from the group consisting of magnesium and calcium salts in an acidic silica hydro-organosol having a pH of from about 1.8 to about 4.5, a silica content of about 4.0% to about 15% by weight and containing less than 2% by weight of alkali metal salt, said alkaline earth metal salt being homogeneously dispersed in said sol, heating said sol thereby forming a gel and heating said gel without subjecting it to a substantial compressive liquid-solid interface until all of the liquid phase of the gel has been converted to a vapor phase, separating said vapor from said gel thereby forming a metal-containing silica aerogel containing siloxy groups, said alkaline earth metal salt being incorporated in said hydro-organosol in an amount sufficient to provide an $SiO_2$ to M ratio, where M is the alkaline earth metal of said alkaline earth metal salt, of from about 5:1 to about 66:1, said alkaline earth metal being chemically bound to a portion of the siloxy groups in said metal containing silica aerogel.

7. The process of preparing a calcium-containing silica aerogel which comprises incorporating from about 1% to 9% by weight of calcium in the form of a water soluble calcium salt in an acidic silica hydro-organosol having a pH of about 1.5 to about 4.5, a silica content of about 4% to about 15% by weight and a liquid phase composed of water and from 25% to 66% by weight, based on the sol, of a water miscible organic liquid having a boiling point below that of water at atmospheric pressure and containing from 0.001% to 2.0% by weight of an alkali metal salt formed by the reaction of an alkali-metal silicate and a mineral acid, said calcium salt being homogeneously dissolved in said sol, heating said sol thereby forming a gel, heating said gel in a closed system without subjecting it to a substantial compressive liquid solid interface until all of the liquid phase of the gel has been converted to a vapor and separating said vapor from said gel thereby forming a calcium-containing silica aerogel.

8. A process as in claim 7, but further characterized in that said organic liquid is methanol.

9. A process as in claim 7, but further characterized in that said organic liquid is acetone.

10. A process as in claim 7, but further characterized in that the calcium salt is calcium acetate.

11. A process as in claim 7, but further characterized in that the organic liquid is ethanol.

be mentioned monohydric alcohols such as methanol, ethanol, isopropanol and tertiary butyl alcohol; ketones such as acetone, methyl ethyl ketone and the like and aliphatic esters, such as for example, ethyl acetate. The preferred organic liquids or diluents are ethanol or acetone.

The starting acidic silicia hydro-organosols, to which the water-soluble, alkaline-earth metal salts are added, are believed to contain aggregates of colloidal silica and/or polysilicic acid dispersed in the liquid phase thereof. It is believed these aggregates initially range in size from 10 to 100 angstroms, as the sols are freshly prepared, but such aggregates continue to grow through siloxane polymerization as the sol ages until a hydro-organo gel is formed. The rate at which such aggregates will grow generally depends on the concentration of the silica, temperature, and the amounts of the water-miscible organic liquid present in the sol as originally prepared. The silica sols containing colloidally dispersed silica or polysilicic acid aggregates are further characterized in having a large number, e.g., a 1000 or more of silanol,

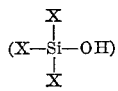

groups on their surfaces wherein X may be either a siloxane radical, a polysiloxane radical, as hereinbefore described, or a hydroxyl group. These aggregates are hydrophilic, yet water-insoluble, and are herein referred to as hydrophilic silica aggregates containing a multitude of silanol groups.

When such hydro-organosols, which consist of colloidally dispersed hydrophilic silica or polysilicic acid containing a multitude of silanol groups, are contacted with a minor proportion of a water soluble salt of an alkaline earth metal, such as, calcium or magnesium, a reaction takes place which does not, as would be expected, form crystalline metal silicates. The reaction appears to be one in which the acid anion of such salt reacts in part with ethyl alcohol to form the corresponding ethyl compound and water, leaving the calcium cation free to react with a portion of the silanol groups on the surface of the hydrophilic silica aggregates to form amorphous silica or polysilicic acid aggregates containing chemically combined calcium or magnesium. When such metal-containing aggregates undergo further polymerization, an amorphous hydro-organogel (or an amorphous aerogel depending on the treatment of the sol) having calcium or magnesium atoms which are chemically bound to a portion of the siloxy

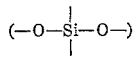

groups in the polymeric lattice of the gel, is formed. Although the exact nature of the chemical reaction between the alkaline earth metal atoms and the silica aggregates is not known with certainty the following chemical bonding is thought to occur

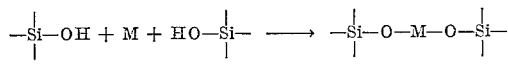

where M is Ca or Mg and the free valences of the silicon atoms are satisfied by siloxane radicals, polysiloxane radicals or hydroxyl groups.

Such chemical bonding is believed to be internally incorporated, as polymerization proceeds, into the polymeric silica or siloxane to provide an amorphous metal-containing silica hydro-organogel until the alkaline earth metal atoms are chemically bound to from 3% to 40%, depending upon the amount of alkaline earth metal salt used, of the siloxy groups present in the gel.

Although any water-soluble calcium or magnesium salt may be used it is usually preferred to use the water soluble calcium or magnesium salts of weak organic acids such as for example acetic acid, formic acid, lactic acid and the like.

The calcium or magnesium salts may be contacted with, or incorporated in, the acidic silica hydro-organosols in a variety of ways such as, for example, by the addition of the alkaline earth metal salt per se to the sol, or in the form of a dispersion in the afore-described water-miscible organic liquid; or a solution-dispersion in a mixture of water and the afore-described water-miscible organic liquid and also an aqueous solution of the alkaline earth metal salt. It is preferred however to incorporate such salts in the acidic sols by adding a saturated aqueous solution of the water soluble calcium or magnesium salts to the acidic hydro-organosol, and it is also desirable to use sufficient agitation or dispersive force to provide a homogeneous solution of such salt in the sol.

The amount of water soluble alkaline-earth metal salt which is incorporated in the acidic silica hydro-organosols may vary considerably but is usually an amount which will provide an aerogel having from 1% to 9% by weight of alkaline earth metal based on the $SiO_2$ content and which will also provide an $SiO_2$:M ratio of from 5:1 to 66:1, preferably in the range of 7:1 to 22:1, wherein M, that is, calcium or magnesium, is chemically bound to from 3% to 40% of the siloxy groups in the resultant amorphous aerogel. When the $SiO_2$:M ratio is less than 5:1 the metal will not be entirely bound in the lattice and the aerogel will contain crystalline calcium silicate and will then generally not be suitable for the same uses as a silica aerogel. On the other hand where the $SiO_2$:M ratio exceeds 66:1 the aerogel will not usually be useful as a thickening agent, although it may be useful for the purposes for which silica aerogels per se have been employed.

The metal-containing silica aerogels of this invention, may be prepared by heating the alkaline-earth metal-containing, acidic, silica hydro-organosols to form a hydro-organogel. In this procedure the sol is usually first charged to a pressure resistant vessel. The sol is then first converted to such a gel in situ by heating the sol, although the gel may also be formed by allowing the sol to stand at relatively low temperatures for a sufficient period of time. The removal of the liquid phase from the gel is next carried out without subjecting the gel to a substantial compressive liquid solid interface, for example, as in the process of U.S. Patent No. 2,093,454 to Samuel S. Kistler, issued September 21, 1937.

In carrying out the removal of the liquid phase from the gel formed in situ from such sol, it is necessary to heat the gel in a closed zone or system in which the pressure may be controlled as desired, for example, in an autoclave until to a temperature such that the liquid phase of the gel has been converted to a vapor, and thereafter the vapor may be released slowly from the closed system without appreciable shrinkage of the gel. This temperature may vary from about 30° C. below the critical temperature to above the critical temperature of the liquid phase of the gel, depending upon the particular organic liquid and concentration thereof, present in the liquid phase of the gel. The temperature is then maintained or raised, as desired, while releasing the vapor slowly until essentially all of the vapor is released from the closed system. Although the temperature may be as much as 30° C. below the critical temperature of the liquid phase of the gel in some instances, satisfactory results may be obtained at such a temperature. On the other hand, some shrinkage of the gel does occur, and it is preferred to avoid this shrinkage by operating at least at the critical temperature of the liquid phase of the gel. Higher temperatures may also be used, for example, temperatures up to about 500° C., but it is preferred not to exceed a temperature of about 450° C.

After the metal-containing aerogels of this invention are formed they are removed from the autoclave and used as such or, if desired, can be readily comminuted or ground to produce amorphous metal-containing aerogels having an average particle size in the range of from about 2 to about 4 microns, a specific surface area of from 10 to 200 square meters per gram and an external surface area of from about 0.9 to 1.6 square meters per gram. After such aerogels are comminuted or ground it has been found generally desirable to heat such aerogels at a temperature in the range of from 500° C. to 650° C. preferably in the range of 550° C. to 590° C. It has presently been found that such heating enhances the properties of such aerogels as thickening agents.

The aerogels of this invention may be ground or comminuted in a variety of ways well-known to those skilled in the art. However, the grinding or comminuting is preferably carried out using an air grinding or air attrition mill, for example of the type illustrated in FIGURE 51 on page 1145 of Chemical Engineers Handbook (3rd edition), published by McGraw-Hill of New York, N.Y. The grinding or comminuting is preferably carried out in an atmosphere of air at a pressure in the range of between 25 and 90 pounds per square inch, depending upon the average particle size which may be desired. For example, when an average particle size of about 2 microns is desired, a higher air pressure, e.g., 90 pounds per square inch, may be used. On the other hand where an average particle size of about 4 microns is desired, an air pressure of about 25 pounds per square inch may be used. However, when the previously known non-alkaline earth metal-containing silica aerogels of Kistler, Marshall or White et al. are ground under similar conditions the resulting ground materials have an average particle size in the range of from 5 to 9 microns.

The particles of the amorphous metal-containing aerogels, when ground as above described, generally have a particle size of 4 microns or less. The particle size distribution is usually such that about 3% to 8% of the total particles are less than 1 micron in size, from 10% to 20% of the particles have a particle size of between 1 and 2 microns, from about 35% to 45% of the particles have a particle size of between 2 and 3 microns, and from 35% to 45% of the particles have a particle size in the range of from 3 to 4 microns. The particle size distribution is preferably such that about 5% of the total particles are less than 1 micron in size, about 15% of the particles have a particle size of between 1 and 2 microns about 40% of the particles have a particle size of between 2 and 3 microns and about 40% of the particles have a particle size in the range of from 3 to 4 microns. In contrast the particle size distribution of the previously described silica aerogels when similarly ground is generally such that none of the particles have a particle size below 1 micron, only 30% of the particles usually have a particle size between 2 and 4 microns and from 60 to 70% of the particles have a particle size of between 4 and 10 microns.

As hereinbefore stated, the ground amorphous aerogels of the present invention usually have a specific surface area in the range of from 10 to 200 square meters per gram, depending upon the number or amount of alkaline-earth metal atoms in the aerogel and other factors, where the specific surface area is measured by the method of Brunauer, Emmett and Teller described in "Advances in Colloid Science," volume I, pages 1–36 (1942), published by Interscience Publishers Inc., New York, N.Y. Thus, for example, a calcium containing aerogel having an $SiO_2$:Ca ratio of 66 molecules of $SiO_2$ for each atom of calcium, generally has a specific surface area of between 50 and 175 square meters per gram, whereas an aerogel containing calcium in an $SiO_2$:Ca ratio of from 10 to 12 molecules of $SiO_2$ for each atom of calcium will usually have a specific surface area from 45 to 65 square meters per gram. On the other hand a magnesium-containing aerogel containing an $SiO_2$:Mg ratio of 13 molecules of $SiO_2$ for each atom of magnesium will usually have a specific surface area of from 140 to 180 square meters per gram.

The aerogels of the present invention are further characterized in having an external surface area in the range of from 0.9 to 1.6 square meters per gram, which surface area is also dependent upon the number or amount of alkaline-earth metal atoms chemically bound in the aerogel. Thus, for example, an aerogel containing magnesium in an $SiO_2$:Mg ratio of 13 molecules of $SiO_2$ for each atom of magnesium generally has an external surface area of about 0.9 square meter per gram; whereas an aerogel containing magnesium in an $SiO_2$:Mg ratio of about 5:1 generally has an external surface area of about 1.2 square meters per gram. On the other hand a calcium-containing aerogel having an $SiO_2$:Ca ratio of 66 molecules of $SiO_2$ for each atom of calcium usually has an external surface area of about 1.05 square meters per gram.

The properties of the pulverulent amorphous metal-containing silica aerogels of this invention, as thickening agents, are usually significantly improved as previously indicated, by heating at a temperature in the range of from 500° C. to 650° C., preferably in the range of 560° C. to 590° C. and such heating is generally carried out for a period of from 30 to 90 minutes, preferably for 40 to 70 minutes. After the heating step, which is preferably carried out in an oven, from 10% to 20% less aerogel is required to achieve the same increase in viscosity in polymerizable liquid polyester resins, as the non-heat-treated, metal-containing silica aerogels.

In general the sols and aerogels of this invention have many physical properties which are very similar to the sols and aerogels of the prior patents hereinbefore referred to. For example, both types of sols are readily converted to aerogels. However, the aerogels produced from the sols of this invention are distinctive from those of the prior patents, hereinbefore referred to, in their thickening properties in addition to the afore-described differences in external surface area and particle size distribution. Also, the aerogels of the present invention are characterized in having an acid number, hereinbefore defined, of 0 whereas the previously known aerogels have an acid number of from 0.1 to 5.

In one preferred embodiment of preparing the calcium-containing silica aerogels of this invention an acidic silica hydro-organosol such as, for example, one of the sols described in the Marshall or White patents, is used as starting material. An acidic silica hydro-organosol having an $SiO_2$ content of between 9% and 11% by weight, a pH of between 2.5 and 3.5, an ethanol content of from 50% to 66% by weight and containing less than about 2% of an alkali metal silicate and an acid has been found particularly suitable for use as a starting material. To this sol is added a sufficient quantity of an aqueous solution containing from 20% to 26% by weight of calcium acetate to provide a metal-containing silica hydro-organosol containing from about 1.8 to 2.0% based on the weight of the last mentioned sol, of calcium acetate and having an $SiO_2$:Ca ratio of from about 10:1 to 12:1, a liquid phase containing from 57% to 59% by weight of ethanol and having a pH of between 6.0 and 6.5.

A calcium-containing amorphous silica aerogel may be readily formed from the calcium-containing sol by any of the procedural steps or techniques of the afore-mention Kistler, Marshall or White patents or as described herein. The calcium atoms in the resultant aerogel are chemically bound to from about 16% to 20% of the siloxy groups in the aerogel and are not present as free calcium oxide, nor is the aerogel composed of a mixture of silica and calcium silicate as will be evident from the specific examples.

The calcium-containing aerogel when ground in the afore-mentioned air attrition mill will produce a finely divided calcium containing aerogel having a specific surface area of from 50 to 175 square meters per gram, an external surface area of from 1.1 to 1.3 square meters 12. A process as in claim 11, but further characterized in that the calcium salt employed is calcium acetate.

13. A process as in claim 7 wherein the calcium containing silica aerogel is ground to a finely-divided powder having an average particle size of between 2 and 4 microns and is thereafter heated to a temperature in the range of from 500° C. to 650° C.

14. The process of preparing a magnesium containing silica aerogel which comprises incorporating from about 3% to 9% by weight of magnesium in the form of a water soluble magnesium salt in an acidic silica hydro-organosol having a pH of from about 1.5 to 4.5, a silica content of about 5% to 11% by weight and a liquid phase composed of water and from about 25% to 66% by weight, based on the weight of the sol, of a water miscible organic liquid having a boiling point below that of water at atmospheric pressure and containing from 0.01% to 2.0% by weight of an alkali metal salt formed by the reaction of an alkali metal silicate and a mineral acid, said magnesium salt being homogeneously dissolved in said sol; heating said sol thereby forming a gel, heating said gel in a closed system without subjecting it to a substantial compressive liquid-solid interface until all the liquid phase of the gel has been converted to a vapor; and separating said vapor from said gel thereby forming a magnesium-containing silica aerogel.

15. The process as in claim 14, but further characterized in that said organic liquid is a solvent selected from the group consisting of methanol, ethanol and acetone.

16. The process as in claim 14, but further characterized in that said organic liquid is ethanol.

17. The process as in claim 16 but further characterized in that the metal salt is magnesium acetate.

18. A process as in claim 14 wherein the magnesium containing silica aerogel is ground to a finely divided powder having an average particle size of between 2 and 4 microns and is thereafter heated to a temperature of from 500° C. to 650° C.

19. The process of preparing a calcium-containing silica aerogel which comprises the steps of adding (1) an aqueous solution of from about 20% to 26% by weight of calcium acetate, to an acidic silica hydro-organosol having a pH of between 2.8 and 3.2, a silica content of from 9% to 11% by weight, a liquid phase composed of water and from 50% to 66% by weight of ethanol and containing from 0.01 to 2.0% based on the sol of an alkali metal sulfate, in an amount sufficient to provide a sol containing from 6% to 8% by weight of silica, a liquid phase containing from about 55% to 59% by weight of ethanol and having dissolved therein from about 1.8% to 2.0% by weight, based on the sol, of calcium acetate; (2) heating the resultant sol thereby forming a gel; (3) heating said gel in a closed system without subjecting it to a substantial compressive liquid-solid interface until all of the liquid phase of the gel has been converted to a vapor; (4) separating the vapor from said gel thereby forming a calcium-containing silica aerogel; (5) grinding the said aerogel to an average particle size of between 2.5 and 3.5 microns and thereafter (6) heating said ground aerogel to a temperature in the range of from 550° C. to 590° C.

References Cited in the file of this patent

UNITED STATES PATENTS

| | | |
|---|---|---|
| 2,203,614 | Goodwin | June 4, 1940 |
| 2,285,449 | Marshall | June 9, 1942 |
| 2,685,569 | Nicholson et al. | Aug. 3, 1954 |
| 2,945,809 | Milberger | July 19, 1960 |
| 2,948,701 | Baker et al. | Aug. 9, 1960 |

FOREIGN PATENTS

| | | |
|---|---|---|
| 833,607 | Great Britain | Apr. 27, 1960 |